United States Patent
McConnell et al.

(10) Patent No.: US 11,073,651 B1
(45) Date of Patent: Jul. 27, 2021

(54) SIDE EMITTING LED AND LIGHT GUIDE DEVICE

(71) Applicant: Look-A-Light, LLC, Granite Bay, CA (US)

(72) Inventors: Stephen M. McConnell, Folsom, CA (US); John Albert Kuhnart, Granite Bay, CA (US)

(73) Assignee: LOOK-A-LIGHT, LLC, Granite Bay, CA (US)

( * ) Notice: Subject to any disclaimer, the term of this patent is extended or adjusted under 35 U.S.C. 154(b) by 0 days.

(21) Appl. No.: 17/007,470

(22) Filed: Aug. 31, 2020

Related U.S. Application Data

(60) Provisional application No. 62/896,545, filed on Sep. 5, 2019.

(51) Int. Cl.
*F21V 7/04* (2006.01)
*F21V 8/00* (2006.01)

(52) U.S. Cl.
CPC ......... *G02B 6/0046* (2013.01); *G02B 6/0028* (2013.01); *G02B 6/0065* (2013.01); *G02B 6/0073* (2013.01); *G02B 6/0076* (2013.01)

(58) Field of Classification Search
CPC .. G02B 6/0046; G02B 6/0076; G02B 6/0065; G02B 6/0073; G02B 6/0018; G02B 6/0031; G02B 6/0038; G02B 6/0053; G02B 6/0055; G02B 6/0016; F21Y 2115/10; F21V 7/28; F21S 43/14
See application file for complete search history.

(56) References Cited

U.S. PATENT DOCUMENTS

| | | | |
|---|---|---|---|
| 4,615,579 A | 10/1986 | Whitehead | |
| 5,005,108 A * | 4/1991 | Pristash | G02B 6/0005 362/23.15 |
| 5,195,162 A | 3/1993 | Sultan et al. | |
| 5,835,661 A * | 11/1998 | Tai | F21S 43/237 385/146 |
| 7,085,460 B2 | 8/2006 | Leu et al. | |
| 7,445,358 B2 | 11/2008 | Matsushita | |
| 7,576,916 B2 | 8/2009 | Amitai | |
| 7,672,055 B2 | 3/2010 | Amitai | |
| 7,724,440 B2 * | 5/2010 | Chaves | G02B 27/143 359/628 |
| 8,911,102 B2 * | 12/2014 | Holman | F21K 9/61 362/147 |

(Continued)

*Primary Examiner* — William J Carter
*Assistant Examiner* — Omar Rojas Cadima
(74) *Attorney, Agent, or Firm* — Jerry Haynes Law

(57) ABSTRACT

An edge-illuminating light guide device works with a consumer electronic to provide directional lighting to efficiently emit illumination from the sides of a screen, while maximizing light emission and minimizing power usage. The device utilizes two light guides that join to direct light from a light source across a directional path from the sides of the device. An ingress light guide has a flat, triangular shape that tapers from a narrow light inlet end to a wide light outlet end. The narrow light inlet end connects to a light source. An egress light guide is defined by a flat, rectangular shape. The egress light guide integrally joins with, and is in illuminating communication with the ingress light guide. A composition coats one of the faces of the egress light guide to prevent passage of the light; thereby serving as a color filter. The device is fabricated from a polycarbonate.

20 Claims, 8 Drawing Sheets

(56) References Cited

U.S. PATENT DOCUMENTS

| | | |
|---|---|---|
| 9,857,517 B2 | 1/2018 | Guo et al. |
| 10,061,071 B2 | 8/2018 | Brand et al. |
| 10,353,142 B2 | 7/2019 | Conrad |
| 2003/0174586 A1* | 9/2003 | Hon .................. G02B 6/0021 368/84 |
| 2009/0273732 A1* | 11/2009 | Shimura ............. G02B 6/0016 349/65 |
| 2014/0042646 A1 | 2/2014 | Kurokawa et al. |

* cited by examiner

1100

BRIGHTNESS UNIFORMITY PLOT

• THIS IS THE MODELED BRIGHTNESS UNIFORMITY ACROSS THE LIGHTGUIDE (NOTE: BLACK IS LIGHT AND WHITE IS DARK IN THIS PLOT)
• IT SHOWS SOME MINOR HOT SPOTS AROUND THE EXTREME EDGES DUE TO THE REDUCED LENGTH OF THE TAPER STAGE AND THE THICKNESS LIMIT OF 3mm FOR THE LIGHTGUIDE (BOTH WERE FIT TO THE PACKAGE WIDTH).
• OTHERWISE IT IS VERY UNIFORM. THIS IS A VERY GOOD RESULT.
• NOTE: UNIFORMITY WILL BE BETTER IN REAL LIFE SINCE MODELING IS LIMITED BY THE TIME AND MACHINE CAPACITY TO CRUNCH MILLIONS OF RAYS

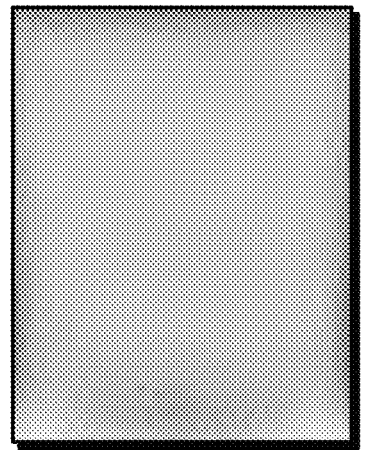

108

HERE IS THE MODELED BRIGHTNESS UNIFORMITY SHOWN WITH THE APERTURE MASK AROUND IT. THE CAT EYE APERTURE FORTUITOUSLY MISSES THE PERIMETER HOT SPOTS

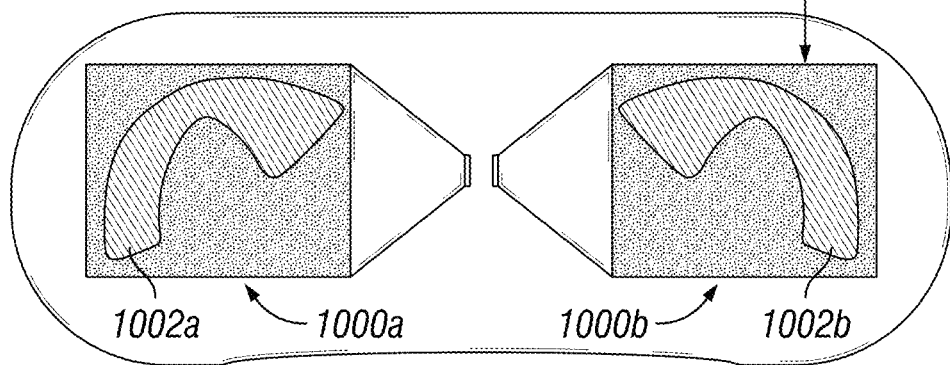

*FIG. 11*

SIDE EMITTING LED AND LIGHT GUIDE DEVICE

CROSS-REFERENCE TO RELATED APPLICATIONS

This application claims the benefits of U.S. provisional application No. 62/896,545, file Sep. 5, 2019 and entitled SIDE EMITTING LED AND LIGHT GUIDE DEVICE, which provisional application is incorporated by reference herein in its entirety.

FIELD OF THE INVENTION

The present invention relates generally to an edge-illuminating light guide device. More so, the present invention relates to light guide device comprising an ingress light guide having a narrow light inlet operatively connected to an LED, and a wide light outlet through which light from the LED emits; and further includes an egress light guide integrally joined with, and in illuminating communication with the ingress light guide; whereby one or more surfaces of the light guide are coated with a composition to restrict light emission therethrough, thereby allowing light to selectively pass through the uncoated surfaces, such as the sides and edges.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Those skilled in the art will recognize that a new generation of high efficiency side emitting light emitting diodes (LEDs) has been widely adopted by the consumer electronics industry. The most common application is cell phones which utilize a large number of them spaced along the sides of the phone. This provides sufficient brightness to make the display visible in all lighting conditions. Such side emitting LEDs are, however, usually the largest power consumer of the phone and dictate its battery life.

The purpose of light guides is to spread the light to a larger area than would otherwise be possible and do this with the least power possible. Typical alternative uses of lightguides are to provide an indicator function on things like notebook computers, routers, set top boxes, and many other consumer electronic products. The present invention provides uniform illumination over a large area, which could be used for backlighting or large-scale indication.

The present invention provides an extremely power efficient side emitting LED and light guide that can illuminate an entire surface uniformly. To accomplish this, one LED and one light-guide is used per eye (device). This combination of high brightness and low power consumption requires a light-guide with uniform illumination however. To realize uniform illumination the tapered and egress light guides are designed with optimized dimensions and angles.

Other proposals have involved waveguides and light guide systems integrated in consumer electronics. The problem with these light guide systems is that they do not optimally illuminate from side edges. Also, these systems consume large amounts of energy. Even though the above cited light guide systems meet some of the needs of the market, an edge-illuminating light guide device having a narrow light inlet operatively connected to an LED, and a wide light outlet through which light from the LED emits; and further includes an egress light guide integrally joined in and in illuminating communication with the ingress light guide; whereby light guide faces is coated with a composition to restrict light emission therethrough, thereby allowing light to selectively pass through the uncoated faces, is still desired.

SUMMARY

Illustrative embodiments of the disclosure are generally directed to an edge-illuminating light guide device. The edge-illuminating light guide device is operable with an electronic apparatus, such as a consumer electronic, such as smart phone screens and televisions. The light guide device is configured to integrate into the electronic apparatus and provide directional lighting while maximizing light emission and minimizing power usage therein. The unique geometric configuration of the device and the selective coating of surfaces allow the electronic device to efficiently emit illumination from the sides, or edges of a screen.

The light guide device utilizes two separate, but integrally joined, light guides that join to direct light from a light source across a directional path—often from the edge, or sides, of the light guide device. An ingress light guide is defined by a flat, triangular shape that tapers from a narrow light inlet end to a wide light outlet end. The narrow light inlet end operatively connects to a light source. The light source generates the light which travels from the narrow light inlet end to the wide light outlet end, which enables at least partial passage of the light through the wide light outlet end.

An egress light guide forms the other component, and is defined by a flat, rectangular shape. The egress light guide integrally joins with, and is in illuminating communication with the ingress light guide. The egress light guide has a geometric three-dimensional shape with multiple faces, including a front face, a back face, and four edge faces, i.e., flat rectangle.

A composition coats at least one of the faces of the egress light guide to at least partially prevent passage of the light; thereby serving as a color filter. At least one of the faces may be coated with the composition to restrict light emission therethrough, thereby allowing light to pass through only the uncoated faces.

The light guide device is fabricated from polycarbonate (Lexan™). The polycarbonate is configured to enable the internal transmission of light in substantially the same capacity as glass. Thus, when the device is integrated into an electronic apparatus, such as a consumer electronic, the light from the LED may be directionally guided through selected faces of the device, and then passing through the side transparent panels of the electronic apparatus.

One aspect of an edge-illuminating light guide device, comprises:
 a light source operable to emit a light;
 an ingress light guide having a narrow light inlet end and a wide light outlet end, the narrow light inlet end being operatively connected to the light emitting diode, the wide light outlet end operable to enable passage of the light emitted from the light emitting diode;
 an egress light guide joined with the wide light outlet end of the ingress light guide, the egress light guide being in illuminating communication with the ingress light guide, the egress light guide being defined by a rectangular three-dimensional shape having multiple side faces and multiple edge faces,
at least one of the side and edge faces enabling passage of the light; and
a composition coating at least one of the side faces and the edge faces of the egress light guide, the composition operable to at least partially restrict the passage of light through the side faces and the edge faces,
whereby the light is directionally guided through the uncoated side faces and edge faces of the egress light guide.

In another aspect, the light source comprises a light emitting diode.

In another aspect, the ingress light guide is defined by a geometric three-dimensional shape having at least one tapered side face and at least one tapered edge face.

In another aspect, the egress light guide is integrally joined, and in illuminating communication with the wide light outlet end of the ingress light guide.

In another aspect, the ingress light guide tapers about 5° from the narrow light inlet end to the wide light outlet end.

In another aspect, the narrow light inlet end terminates at an inlet face.

In another aspect, the inlet face of the narrow light inlet end is operatively connected to the light source.

In another aspect, the ingress light guide has a generally flat, triangular shape.

In another aspect, the width of the inlet face of the narrow light inlet end is about 3 millimeters.

In another aspect, the width of the light outlet end is about 23 millimeters.

In another aspect, the egress light guide is defined by a generally flat, rectangular shape.

In another aspect, the length of the egress light guide is about 28 millimeters, the width of the egress light guide is about 23 millimeters wide, and the thickness of the egress light guide is about 3 millimeters.

In another aspect, the multiple side and edge faces of the egress light guide comprise a front face, a back face, and at least two edge faces.

In another aspect, the at least two edge faces are rounded.

In another aspect, the ingress light guide and the egress light guide comprise a polycarbonate material.

In another aspect, the ingress light guide and the egress light guide comprise an acrylic polycarbonate material.

In another aspect, the light emitting diode comprises an edge-lit white light emitting diode.

In another aspect, the composition comprises a white paint.

In another aspect, the composition is applied to the faces through a zero air-gap coating process.

In another aspect, the device further includes at least one ejector pin introduced into the back face of the egress light guide.

In another aspect, the device is configured to enable operatively joining an at least partially transparent panel from an electronic apparatus, whereby the light passes from the light emitting faces of the egress light guide and through the at least partially transparent panel.

One objective of the present invention is to provide a light guide with a narrow light ingress portion, and a wide light egress portion having selectively coated faces for directional transmission of the light.

Another objective is to produces directional lighting for consumer electronics, while maximizing light emission and minimizing power usage.

Another objective is to create a light guide that forms taper from the light source to the face where the light emits, so as to produce efficient transition from light entrance to the emission face.

Another objective is to provide directional lighting while maximizing light emission and minimizing power usage.

Another objective is to directionally control the light through a white paint composition selectively applied to the faces of the light guide.

Yet another objective is to illuminate a large surface area with great efficiency and low power.

Yet another objective is to vary the power and directly control the brightness.

Yet another objective is to improve optical efficiency selected surfaces through use of a zero air-gap coating.

Yet another objective is to provide an inexpensive to manufacture edge-illuminating light guide device.

Other devices, devices, methods, features, and advantages will be or become apparent to one with skill in the art upon examination of the following drawings and detailed description. It is intended that all such additional devices, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 1A shows a top perspective view, and FIG. 1B shows a bottom perspective view, in accordance with an embodiment of the present invention;

FIG. 6A shows a top view, and FIG. 6B shows an elevated side view, in accordance with an embodiment of the present invention;

FIG. 7A shows a top view, and FIG. 7B shows an elevated side view, in accordance with an embodiment of the present invention;

FIG. 9A shows a top view, and FIG. 9B shows a bottom view, in accordance with an embodiment of the present invention;

FIG. 10A shows a front view, and FIG. 10B shows a rear view of the egress light guide, in accordance with an embodiment of the present invention;

FIG. 11 illustrates a side view of a brightness uniformity plot on the face of the egress light guide, in accordance with an embodiment of the present invention;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An edge-illuminating light guide device is referenced in FIGS. 1-17. The edge-illuminating light guide device 100, hereafter "device 100", is configured to operate with an electronic apparatus, or consumer electronic, such as smart phone screens and televisions. The device 100 utilizes a unique geometric configuration, and selectively coated surfaces, to create a directional lighting effect for the electronic apparatus. The unique geometric shape is also efficacious for emitting a maximum amount of light, and minimizing power usage by the electronic apparatus. Thus, when integrated into the electronic apparatus, the device 100 allows the sides, or edges, of a transparent screen, panel, or housing for the electronic apparatus to efficiently illuminate.

Figure 1A:
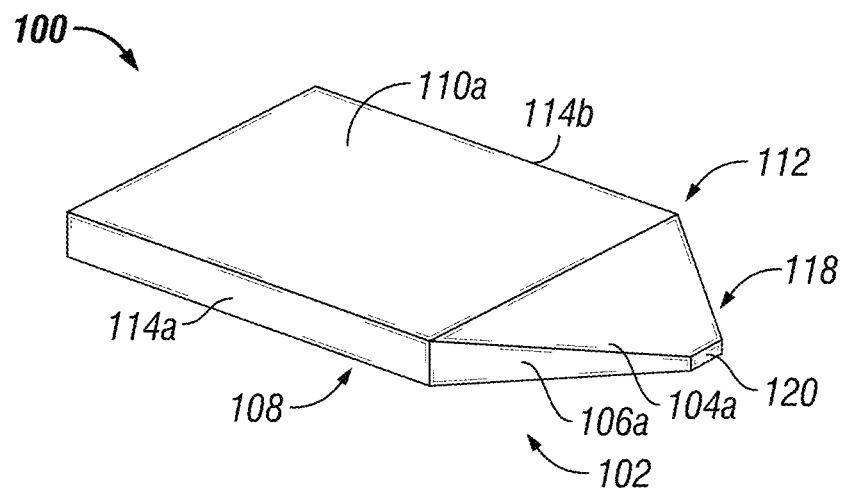
FIGS. 1A and 1B illustrate an exemplary edge-illuminating light guide device, where

Looking initially at FIG. 1A, the device 100 utilizes two uniquely structured light guides 102, 108 that join in a geometric relationship to create a synergistic light-guiding structure. The light guides 102, 108 are integrated in an electronic apparatus, such as a screen for a smartphone or television, so as to directionally guide light waves, with a minimal loss of energy by restricting the transmission of energy to one direction.

In one embodiment, the light guides 102, 108 direct the light from an attached light source 116, such as a light emitting diode (LED), across a directional path—often from the edge faces, or side faces, of the light guides. Thus, when the device 100 is integrated into an electronic apparatus, the light from the light source can be directionally guided through selected faces of the device 100, and then passed through the side transparent panels of the smartphone display and housing.

Figure 1B:
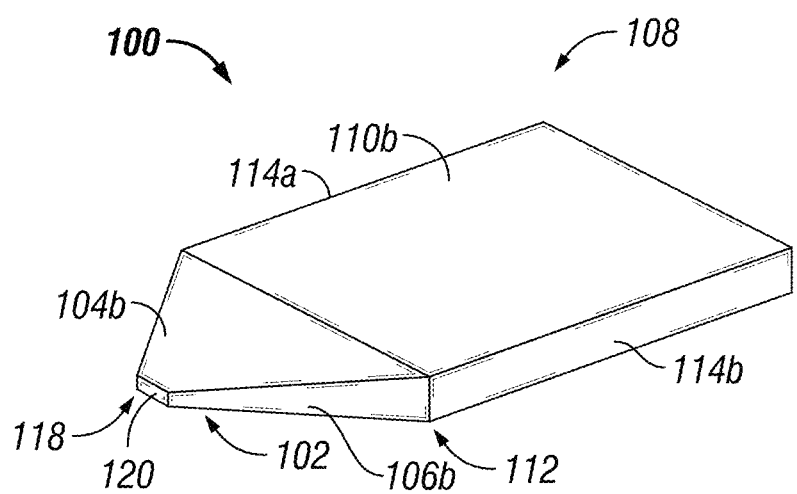

In one embodiment shown in FIG. 1B, the device 100 includes an ingress light guide 102 having a narrow light inlet end 118 and a wide light outlet end 112. The narrow light inlet end 118 is operatively connected to a light source 116, such as a light emitting diode (LED). The light source 116 generates the light which travels from the narrow light inlet end 118 to the wide light outlet end 112, which enables at least partial passage of the light therethrough.

Figure 2:
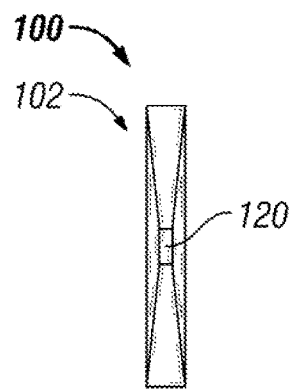
FIG. 2 illustrates a side view of an exemplary ingress light guide, in accordance with an embodiment of the present invention.
Figure 3:
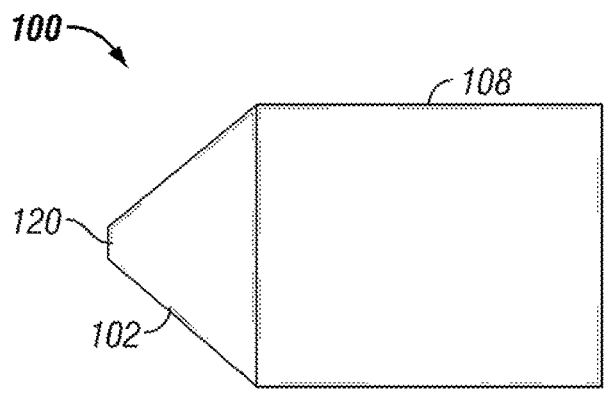
FIG. 3 illustrates a top view of an ingress light guide and an egress light guide, in accordance with an embodiment of the present invention.

In another embodiment shown in FIG. 2, the device 100 includes an egress light guide 108, having a flat, rectangular shape. The egress light guide 108 integrally joins with, and is in illuminating communication with the ingress light guide 102. The egress light guide 108 is defined by a geometric three-dimensional shape having multiple faces, including a front face 110a, a back face 110b, and multiple edge faces 114a-b. As illustrated in FIG. 3, this can form a substantially flat, rectangular shape. Similar non-rectangular shapes having similar dimensions may also be used, however, for the egress light guide 108.

In yet another embodiment, a composition 600 coats the ingress light guide 102 and the egress light guide 108, which serves as a color filter coats at least one of the faces to create different lighting configurations. At least one of the faces may be coated to restrict light emission therethrough, thereby allowing light to pass through only the uncoated faces. Further, the device 100 is fabricated from polycarbonate (Lexan™). The polycarbonate is configured to enable the internal transmission of light in substantially the same capacity as glass.

Figure 6B:
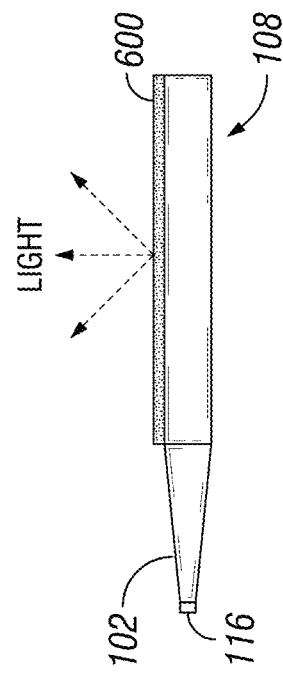
FIGS. 6A-6B illustrates an egress light guide, showing a colored filter on the top face, where

Looking ahead at FIG. 6B, the device 100 may include a light source 116 that is operable to emit a light. In one non-limiting embodiment, the light source 116 comprises a light emitting diode (LED). In some embodiments, eclectic variations of light sources, known in the art of consumer electronics, may be used. The light source 116 may emit a white or colored light. In one possible embodiment, the light source 116 is a Nichia edge-lit white light emitting diode. Various LEDs, wattages, and circuitry may be used, however, to generate the light with the light source 116. Further, the light source 116 may be independent with its own power source, or may be a component of the electronic apparatus.

It is intended that using an LED as the light source 116 allows a large surface to be illuminated with great efficiency and low power. Further the power can be varied and the brightness controlled 116 more directly. For example, Table 1700 in FIG. 17 references the specs for the LED 116, including the Relative Emission Intensity to the Wavelength.

The Table 1700 illustrates the optimal intensity of light from the Led, based on color filters used on the faces of the light guides 102, 108.

Figure 4:
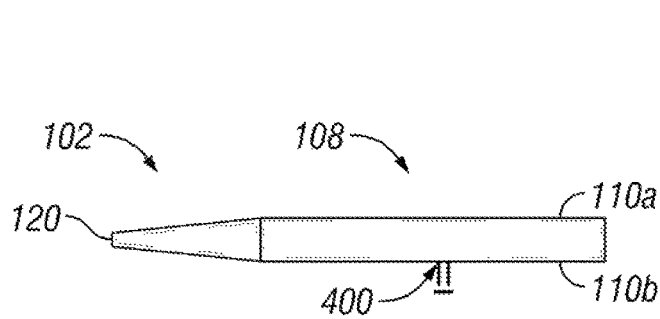
FIG. 4 illustrates an elevated side view of an ingress light guide and an egress light guide, in accordance with an embodiment of the present invention.
Figure 5:
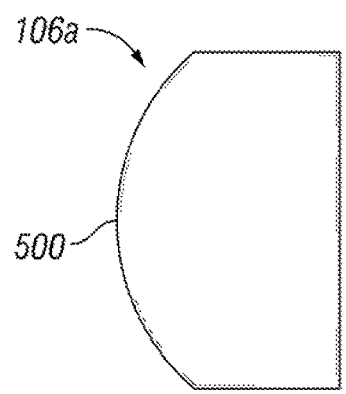
FIG. 5 illustrates a side view of a vertical wall of the ingress light guide, in accordance with an embodiment of the present invention.

As referenced in the side view in FIG. 2, the device 100 comprises an ingress light guide 102 that is proximal, or joined with the light source 116. The ingress light guide 102 may be defined by a geometric three-dimensional shape having at least one tapered side face 104a, 104b and at least one tapered edge face 106a, 106b (FIGS. 3 and 4). This can form a generally flat, triangular shape. Both the tapered side faces and the tapered edge faces 104a-b, 106a-b have a slight slope to the vertical. For example, FIG. 5 illustrates an exemplary dimension of the vertical edge face 106a, showing a 0.5° slope.

Figure 7B:
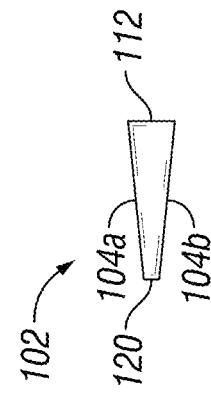
FIGS. 7A-7B illustrates an ingress light guide, where
Figure 7A:
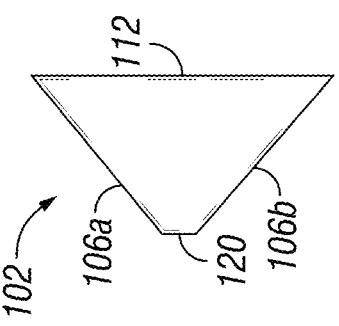

The ingress light guide 102 can also be defined by a narrow light inlet end 118 and an opposing a wide light outlet end 112, creating the flat, triangular configuration. For example, FIG. 7A shows a top view of the ingress light guide 102, and FIG. 7B shows an elevated side view of the ingress light guide 102. The ingress light guide 102 is designed to carry light from narrow area to wide area, allowing the light intensity to decrease.

In one non-limiting embodiment, the width of the light outlet end 112 is about 23 millimeters. The shape and dimensions of the ingress light guide can be changed, however, to accommodate different uses and electronic devices. In other embodiments, different dimensions may be used, because of the scalable capacity of the device 100.

The narrow light inlet end 118 aligns with, and joins with the light source 116, enabling passage of the light therethrough. The wide light outlet end 112 is configured to enable passage of the light that was emitted from the light source 116 through the narrow light inlet end 118. In one embodiment, the ingress light guide tapers about 5° from the narrow light inlet end 118 to the wide light outlet end 112. In other embodiments, greater or lesser slopes may be used to accommodate different light intensities from the light source.

The narrow light inlet end 118 terminates at an inlet face 120, which is operatively connected to the light source 116. Thus, an LED having the same dimensions as the inlet face 120 can be fastened together through a clamp, adhesive, or other known fastening means in the field of waveguides and light guides. In one non-limiting embodiment, the width of the inlet face is about 3 millimeters (See FIGS. 7A-7B). In other embodiments, different dimensions may be used, because of the scalable capacity of the device 100.

The other light guide used by the device 100 is an egress light guide 108. The egress light guide 108 may integrally join with the ingress light guide 102. FIG. 3 illustrates a top view of an ingress light guide 102 and an egress light guide 108. The egress light guide 108 is also in illuminating communication with the ingress light guide 102, such that light received from the light source 116, passes through the ingress light guide 102 and the egress light guide 108.

Given that the light entrance face of the ingress light guide 102 and the minimum dimensions of the egress light guide 108 are fixed, the ingress light guide 102 must be designed to provide the transition from light entrance to the egress light guide 108. This means that to get the optimal optical performance and not lose light (waste power) the optimal launch taper along with the thickness of the emission face and the finial dimensions of the emission face must be identified.

As shown in FIG. 4, the egress light guide 108 is defined by a rectangular three-dimensional shape having multiple side faces and multiple edge faces. In one possible embodiment, the multiple side and edge faces of the egress light guide 108 comprise a front face 110a (FIG. 1A), a back face 110b (FIG. 1B), and at least two edge faces 114a, 114b. In another embodiment, four edge faces are used. This creates a generally flat, rectangular shape. In one possible embodiment, the at least two edge faces 114a-b are rounded edges 500 (See FIG. 5). The rounded edge 500 configuration is efficacious for optimal transmission of light therethrough. Also, the light is more uniformly emitted through a rounded edge 500.

At least one of the side and edge faces of the egress light guide 108 enable passage of the light therethrough. For example, if the light is restricted from passing through the edges and one of the side faces, then the light transmission through the egress light guide is only through the unrestricted side face, which may create an intense illumination on that face.

The egress light guide 108 may have a generally flat, rectangular shape. In one non-limiting embodiment, the length of the egress light guide 108 is about 28 millimeters. The width of the egress light guide 108 is about 23 millimeters wide. And the thickness of the egress light guide 108 is about 3 millimeters. In other embodiments, different dimensions may be used, because of the scalable capacity of the device 100.

Furthermore, many of the dimensions of the light guide are dictated by the design of the egress light guide 108 and the light source 116. To accommodate as many light source 116 choices as possible the narrow light inlet end 118 that is operatively connected to the light source 116 (light entrance face) of the ingress light guide 102 is fixed, while the emitting surface dimensions are dictated by the electronic consumer device 100. In some embodiments, the consumer electronic device 100 is in illuminating communication with the egress light guide 108. In this manner, the light emitting from the device 100 is used for illuminating the electronic consumer device, i.e., a phone screen, monitor.

Figure 8:
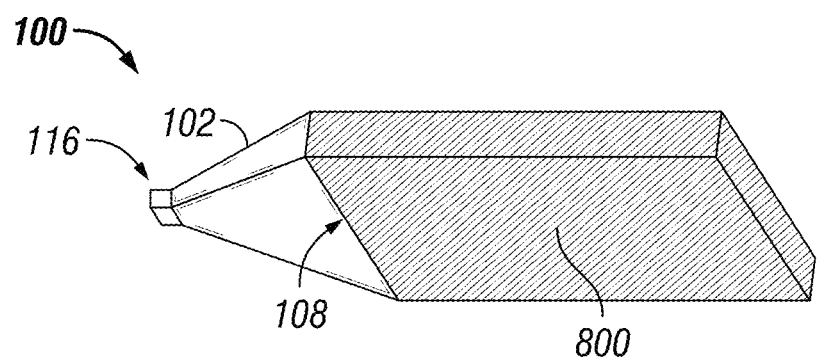
FIG. 8 illustrates an egress light guide that is coated at the edges and back face, in accordance with an embodiment of the present invention.

Turning now to FIG. 8, selected surfaces of the egress light guide 108 are coated with a composition to reflect (prevent the exiting of and thus loss of) any light waves from all but the desired surface. To accomplish this, at least one of the faces is coated with a composition 800 to restrict light emission therethrough, whereby light selectively passes through the uncoated faces. In one embodiment, a composition 800 coats at least one of the side faces and the edge faces of the egress light guide 108. In this manner, the composition 800 is configured to at least partially restrict the passage of light through the side faces and the edge faces. The light is directionally guided through the uncoated side faces and edge faces of the egress light guide 108.

In one non-limiting embodiment, the composition 800 comprises a white paint. The composition may be applied to the faces through a zero air-gap coating process. In some embodiments, the device 100 may also include at least one ejector pin 400 introduced into the back face 110b of the egress light guide 108 (FIG. 4). The ejector pin 400 is configured to fasten the device 100 to the electronic apparatus. In this manner, the device 100 can fasten to a transparent, or partially transparent, panel from an electronic apparatus, whereby the light passes from the light emitting faces of the egress light guide 108 and through the at least partially transparent panel.

Figure 9A:
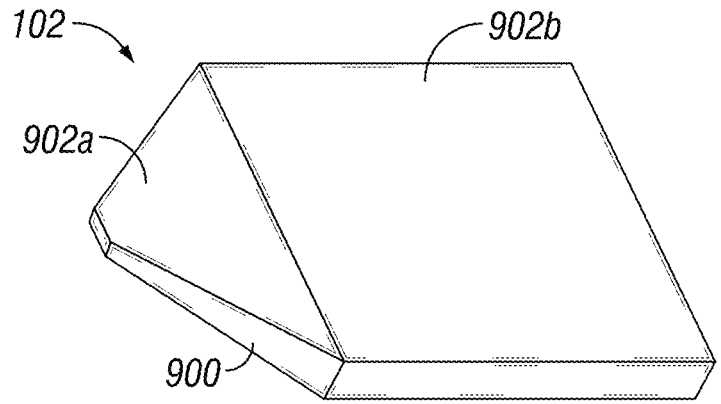
FIGS. 9A-9B illustrate an ingress light guide with coated and non-coated faces, where
Figure 9B:
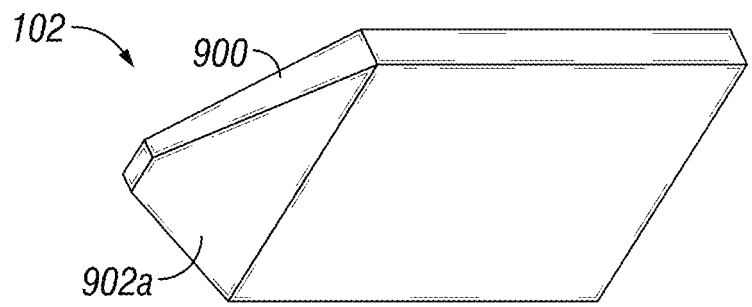

For example, the egress light guide 108 has a front face and edge faces, coated with a white color. In this coating configuration, the back face is uncoated, and thereby emits the light therethrough. FIGS. 9A-9B illustrate an ingress light guide with coated and non-coated faces, where FIG. 9A shows a top view, and FIG. 9B shows a bottom view. As illustrated a lower section shows a coated edge face 900, while the broad side face and upper section of the edge face are shown as uncoated faces 902a, 902b, respectively. In this embodiment, the ingress light guide 102 is not coated, and has faces that are clear and specular. In order to further improve optical efficiency selected surfaces must have a zero air-gap coating. Such optimization of optical dimensions and performance is normally done by computer simulation.

Figure 6A:
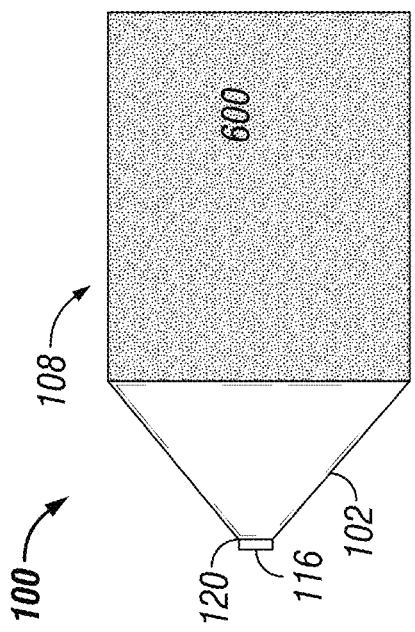

In alternative embodiments, shown in FIG. 6A, a color filter 600 is layered over at least one of the front face 110a, back face 110b, and multiple edge faces 114a, 114b. The color filter 600 works to change the color of light emitting from the egress light guide 108 (FIG. 6B). Various colors can be used for this purpose. In one non-limiting embodiment, the color filter 600 is fabricated from polycarbonate (Lexan™).

One embodiment of the light guides is to take advantage of the properties of plastic which can easily be injection molded to any shape or size desired. Thus, in one possible embodiment, the ingress light guide 102 and the egress light guide 108 are fabricated from polycarbonate (Lexan™). Polycarbonate is unique in allowing for the internal transmission of light nearly in the same capacity as glass however other plastics may be used.

In some embodiments, the ingress light guide 102 and the egress light guide 108 comprise a polycarbonate material. An acrylic may also be used in combination with the polycarbonate material. The polycarbonate material has many of the light transmission characteristics of glass; yet is also more durable and cost effective to manufacture.

Figure 10A:
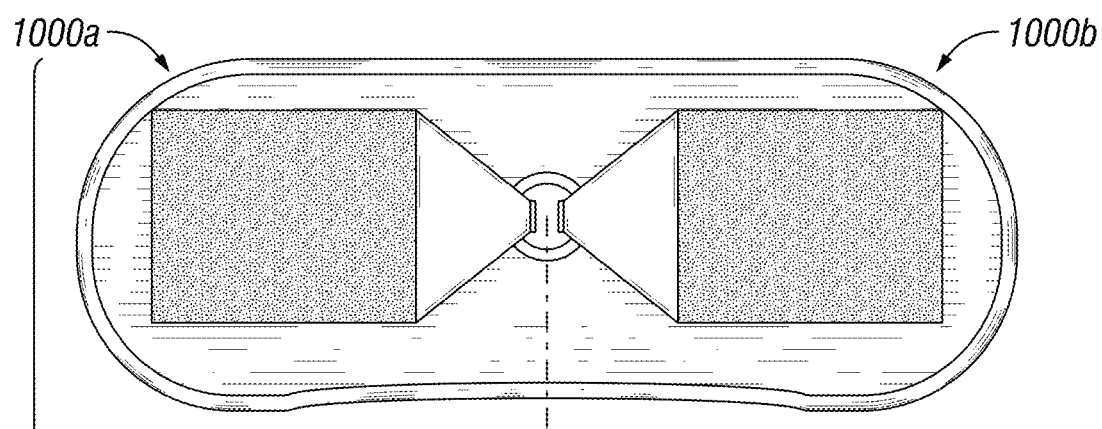
FIGS. 10A-10B illustrate a pair of devices joined at the narrow end and coated to form a cat's eye design illumination, where
Figure 10B:
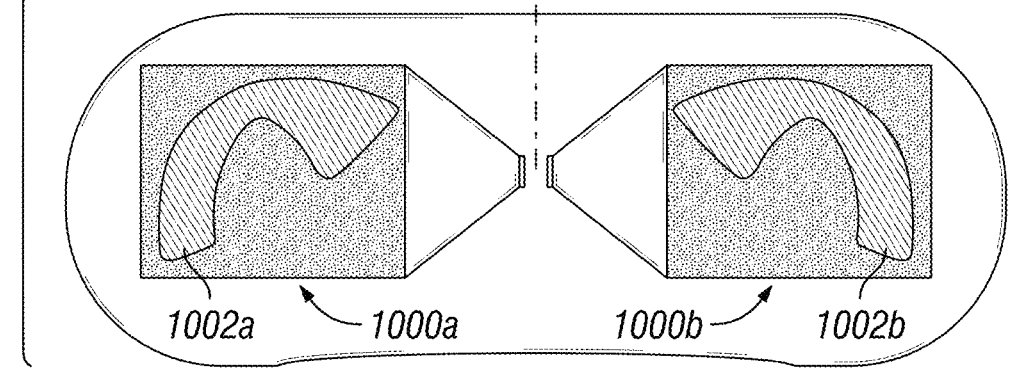

Once the design criteria are established and all the mechanical dimensions are identified the device 100 can be tooled for high volume injection molding which results in extremely low costs. For example, FIG. 10A shows a pair of devices 1000a, 1000b facing each other with the narrow light inlet ends facing each other, and their corresponding egress light guides facing away and illuminating light. This dual device 1000a-b configuration is effective for consumer electronic products, being highly reproducible and cheap. Using the dual device 1000a-b configuration, a large surface area may be illuminated with great efficiency and low power. As illustrated in FIG. 10B, the back face of the egress light guides shows a coated section with the composition 800, creating a "cats eye" illumination design 1002a, 1002b.

Further the power from the light source 116 can be varied and the brightness controlled more directly. FIG. 11 shows a brightness uniformity plot. This shows the modeled brightness across the front and back faces 110a, 110b of the egress light guide 108. Minor hot spots around the edges are because of the reduced length of the taper stage and the 3 mm dimensions.

Figure 12:
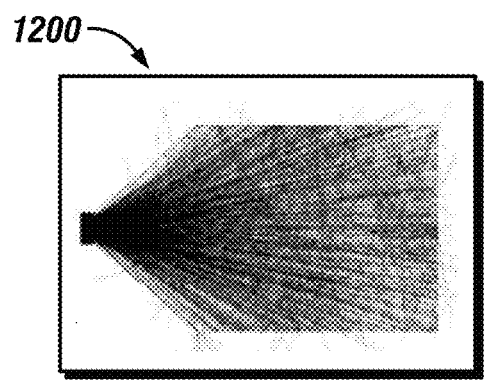
FIG. 12 illustrates a perspective view of an ideal Lambertian ray launch transforms into LG from the front face of the egress light guide, in accordance with an embodiment of the present invention.
Figure 13:
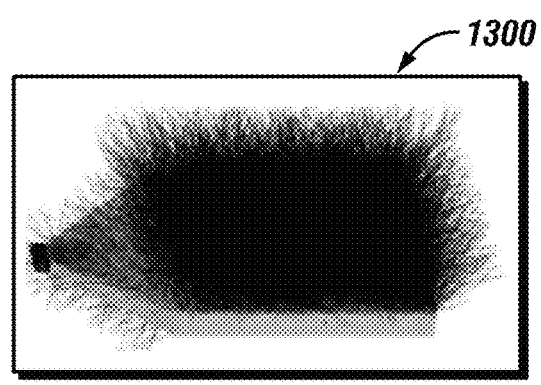
FIG. 13 illustrates a perspective view of a high output face ray flux and good uniformity from the front face of the egress light guide, in accordance with an embodiment of the present invention.
Figure 14:
FIG. 14 illustrates a side view of a wide horizontal and vertical Lambertian light distribution, in accordance with an embodiment of the present invention.
Figure 15:
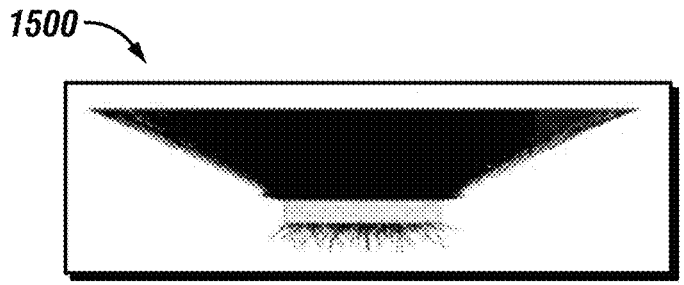
FIG. 15 illustrates a side view of a wide horizontal and vertical Lambertian light distribution, in accordance with an embodiment of the present invention.

Other examples of brightness uniformity and light direction are referenced in FIGS. 12-16. In FIG. 12, an ideal Lambertian ray launch 1200 transforms into LG from the front face of the egress light guide 108. In FIG. 13, a high output face ray flux 1300 and good uniformity are shown from the front face of the egress light guide 108. Continuing, FIG. 14 and FIG. 15 show wide horizontal light distribution 1400 and vertical Lambertian light distribution 1500, respectively.

Figure 16:
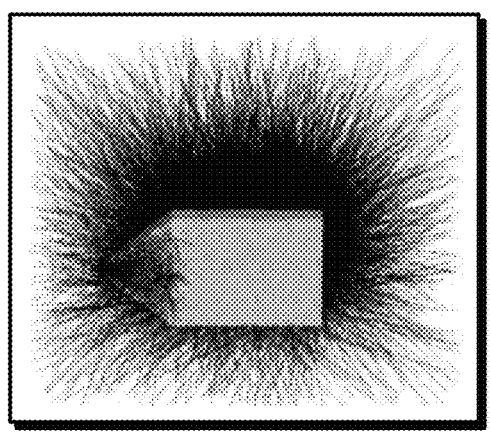
FIG. 16 illustrates a top view of a wide horizontal and vertical Lambertian light distribution, in accordance with an embodiment of the present invention.
Figure 17:
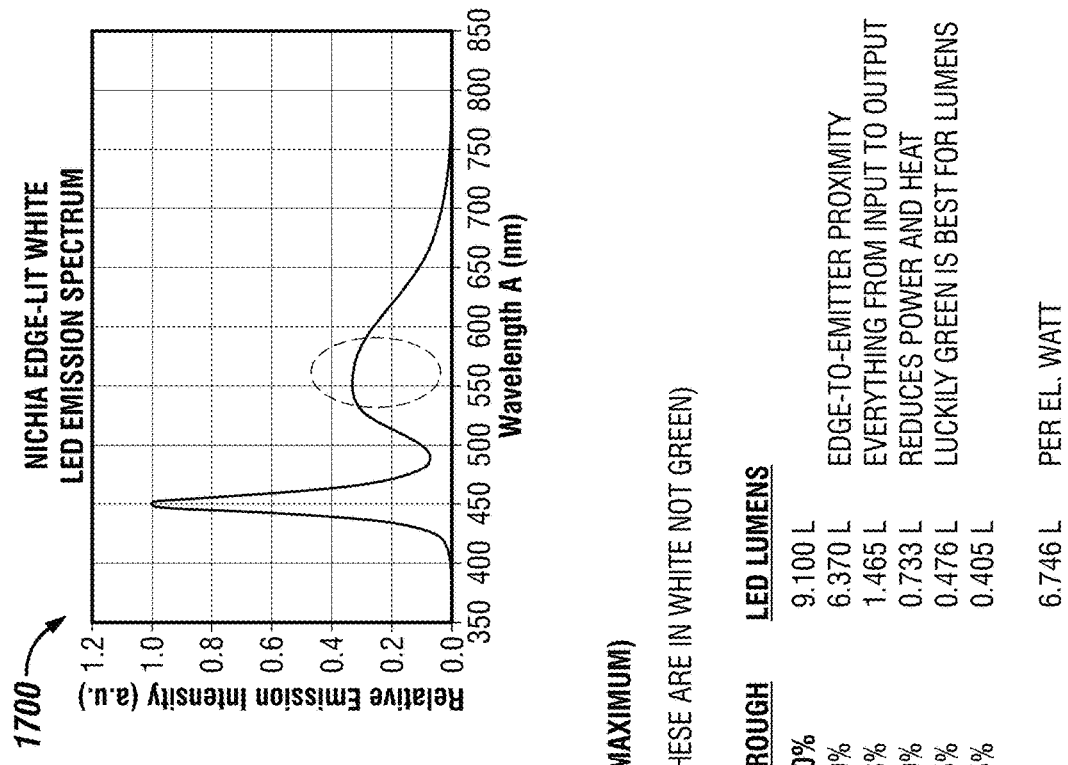
FIG. 17 illustrates a Table of showing the specs for the LED, including the Relative Emission Intensity to the Wavelength, in accordance with an embodiment of the present invention.

Finally, FIG. 16 shows the illumination emission flux 1600 working to performance specification at a sub-device packaging size. Furthermore, the device 100 provides backlighting so as to further enhance battery powered consumer electronics. And as discussed above, Table 1700 in FIG. 17 references the specs for the LED 116, including the Relative Emission Intensity to the Wavelength. The Table 1700 illustrates the optimal intensity of light from the Led, based on color filters used on the faces of the light guides 102, 108.

In conclusion, an edge-illuminating light guide device works with a consumer electronic to provide directional lighting to efficiently emit illumination from the sides of a screen or display, while maximizing light emission and minimizing power usage. The device utilizes two light guides that join to direct light from a light source across a directional path from the sides of the device. An ingress light guide has a flat, triangular shape that tapers from a narrow light inlet end to a wide light outlet end. The narrow light inlet end connects to a light source. An egress light guide is defined by a flat, rectangular shape. The egress light guide integrally joins with, and is in illuminating communication with the ingress light guide. A composition coats one of the faces of the egress light guide to prevent passage of the light; thereby serving as a color filter. The device is fabricated from a polycarbonate. Thus, when the device is integrated into an electronic apparatus, such as a consumer electronic, the light from the LED may be directionally guided through selected faces of the device, and then passing through the side transparent panels of the electronic apparatus These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An edge-illuminating light guide device, the device comprising:
    an ingress light guide having a narrow light inlet end and a wide light outlet end, the ingress light guide disposed to taper about 5 degrees from the narrow light inlet end to the wide light outlet end;
    an egress light guide having multiple side faces, multiple edge faces, a front face, and a back face, at least one of the edge faces being joined with the wide light outlet end of the ingress light guide, the egress light guide being in illuminating communication with the ingress light guide;
    a composition coating on at least one of the multiple side faces or multiple edge faces of the egress light guide;
    at least one ejector pin introduced into the back face of the egress light guide, the ejector pin being operable to enable fastening the device to an electronic apparatus; and
    whereby a pair of devices are oriented, such that the narrow light inlet ends face each other in proximity.

2. The device of claim 1, further comprising a light source operable to emit a light.

3. The device of claim 2, wherein the light source comprises a light emitting diode.

4. The device of claim 2, wherein an inlet face of the narrow light inlet end is operatively connected to the light source.

5. The device of claim 4, wherein the wide light outlet end of the ingress light guide is operable to enable passage of the light.

6. The device of claim 5, wherein the at least one of the multiple side faces or multiple edge faces of the egress light guide enables passage of the light.

7. The device of claim 6, wherein the composition is operable to at least partially restrict passage of the light through the at least one of the multiple side faces or multiple edge faces of the egress light guide, whereby the light is directionally guided through the uncoated faces of the egress light guide.

8. An edge-illuminating light guide device, the device comprising:
   a light source operable to emit a light;
   an ingress light guide having a narrow light inlet end and a wide light outlet end, the narrow light inlet end being operatively connected to the light source, the wide light outlet end operable to enable passage of the light emitted from the light source;
   an egress light guide having multiple side faces and multiple edge faces, at least one of the edge faces being joined with the wide light outlet end of the ingress light guide, the egress light guide being in illuminating communication with the ingress light guide, the at least one of the multiple side faces or multiple edge faces of the egress light guide enabling passage of the light;
   a composition coating at least one of the faces of the egress light guide, the composition operable to at least partially restrict passage of the light through the at least one of the multiple side faces or multiple edge faces of the egress light guide,
   whereby the light is directionally guided through the uncoated faces of the egress light guide;
   at least one ejector pin introduced into the back face of the egress light guide, the ejector pin being operable to enable fastening the device to an electronic apparatus; and
   whereby a pair of devices are oriented, such that the narrow light inlet ends face each other in proximity.

9. The device of claim 8, wherein the light source comprises a light emitting diode.

10. The device of claim 8, wherein the ingress light guide is defined by a geometric three-dimensional shape having at least one tapered side face and at least one tapered edge face.

11. The device of claim 10, wherein the egress light guide slopes about 5 degrees from the narrow light inlet end to the wide light outlet end.

12. The device of claim 8, wherein the narrow light inlet end terminates at an inlet face, the inlet face joining with the light source.

13. The device of claim 8, wherein the faces of the egress light guide comprise a front face, a back face, and at least two edge faces.

14. The device of claim 13, wherein the at least two edge faces are rounded.

15. The device of claim 13, further comprising at least one ejector pin introduced into the front face, the back face, or both, of the egress light guide.

16. The device of claim 8, wherein the width of the inlet face of the narrow light inlet end is about 3 millimeters, and the width of the light outlet end is about 23 millimeters.

17. The device of claim 8, wherein the length of the egress light guide is about 28 millimeters, the width of the egress light guide is about 23 millimeters wide, and the thickness of the egress light guide is about 3 millimeters.

18. The device of claim 8, wherein the ingress light guide and the egress light guide comprise a polycarbonate material.

19. The device of claim 8, wherein the composition comprises a white paint applied to the faces through a zero air-gap coating process.

20. An edge-illuminating light guide device, the device comprising:
   a light emitting diode operable to emit a light;
   an ingress light guide having a narrow light inlet end and a wide light outlet end, the narrow light inlet end being operatively connected to the light emitting diode, the wide light outlet end operable to enable passage of the light emitted from the light emitting diode, the ingress light guide being defined by a geometric three-dimensional shape having at least one tapered side face and at least one tapered edge face, the ingress light guide being configured to slope about 5 degrees from the narrow light inlet end to the wide light outlet end, the ingress light guide comprising a polycarbonate material;
   the egress light guide joined with the wide light outlet end of the ingress light guide, the egress light guide being in illuminating communication with the ingress light guide, the egress light guide being defined by a rectangular three-dimensional shape having a front face, a back face, and at least two edge faces, the at least two edge faces being rounded,
   at least one of the faces of the egress light guide enabling passage of the light, the egress light guide comprising a polycarbonate material;
   a composition coating at least one of the faces of the egress light guide, the composition operable to at least partially restrict passage of the light through the faces of the egress light guide, the composition comprising a white paint applied to the faces through a zero air-gap coating process,
   whereby the light is directionally guided through the uncoated faces of the egress light guide; and
   at least one ejector pin introduced into the front face, the back face, or both, of the egress light guide; and
   whereby a pair of devices are oriented, such that the narrow light inlet ends face each other in proximity.

* * * * *